United States Patent [19]
Allen et al.

[11] Patent Number: 5,840,785
[45] Date of Patent: Nov. 24, 1998

[54] MOLDING PROCESS FEEDSTOCK USING A COPPER TRIFLATE CATALYST

[75] Inventors: Jeanne K. Allen, St. Peters; Gregory M. Brasel, Ballwin, both of Mo.

[73] Assignee: Megamet Industries, St. Charles, Mo.

[21] Appl. No.: 626,131

[22] Filed: Apr. 5, 1996

[51] Int. Cl.$^6$ .............................. B22C 1/22; C08K 5/53; C08K 5/42; C08K 5/17
[52] U.S. Cl. .......................... 523/145; 523/144; 523/209; 524/35; 524/165; 524/236; 524/309; 524/391
[58] Field of Search ................................. 523/145, 144, 523/209; 524/35, 236, 306, 391, 165

[56] References Cited

U.S. PATENT DOCUMENTS

| | | | |
|---|---|---|---|
| 2,939,199 | 6/1960 | Strivens | 264/63 |
| 3,644,274 | 2/1972 | Maurukas | 523/144 |
| 3,842,019 | 10/1974 | Kropp | 522/59 |
| 3,989,518 | 11/1976 | Rueckl | 419/28 |
| 4,113,480 | 9/1978 | Rivers | 419/2 |
| 4,197,118 | 4/1980 | Wiech, Jr. | 75/228 |
| 4,225,345 | 9/1980 | Adee et al. | 419/36 |
| 4,284,431 | 8/1981 | Ohno et al. | 419/35 |
| 4,305,756 | 12/1981 | Wiech, Jr. | 419/36 |
| 4,404,166 | 9/1983 | Wiech, Jr. | 419/36 |
| 4,415,528 | 11/1983 | Wiech, Jr. | 419/46 |
| 4,543,373 | 9/1985 | Krawiec et al. | 523/144 |
| 4,604,259 | 8/1986 | Whitman | 75/247 |
| 4,795,598 | 1/1989 | Billiet | 264/40.6 |
| 4,828,479 | 5/1989 | Pleasant | 425/192 R |
| 5,059,387 | 10/1991 | Brasel | 419/23 |

*Primary Examiner*—Kriellion S. Morgan
*Attorney, Agent, or Firm*—Polster, Lieder, Woodruff & Lucchesi, LC

[57] ABSTRACT

An improved feedstock material for D-RIM type PIM processes to manufacture parts. The feedstock includes metal or powders or a mixture thereof which is coated with a surfactant to improve rheology and keep the powder from inhibiting a catalytic reaction which occurs during the process. A condensation thermosetting resin is mixed with a latent catalyst and added to the mixture. A modifier can also be added to the mixture, as can a latent catalyst which is a metal salt such as copper triflate. The constituents when mixed together form a uniform feedstock which is injected into a heated mold. The mixtures cures in the mold and a partial debinding occurs. When the part is removed from the mold, it is sintered. Addition of the copper triflate adds significantly to the green strength of the part, and allows parts to be made at least as quickly as parts made from other feedstock materials. Hydrating the copper triflate greatly increases the shelf life of the feedstock. Modifying the resin makes the feedstock dilatant to allow removal of gaseous by-products of the condensation resin without forming porosity defects.

37 Claims, No Drawings

MOLDING PROCESS FEEDSTOCK USING A COPPER TRIFLATE CATALYST

BACKGROUND OF THE INVENTION

This invention relates to injection molding, and more particularly, to a powder injection molding process using a feedstock material employing a catalyst such as a copper or chromium triflate.

Powder injection molding (PIM) is a process which differs from other powder metallurgy manufacturing methods because PIM is useful for making small, intricately shaped parts having both a controlled porosity and density from metal powders, ceramic powders, or mixtures of metal and ceramic powders. There are four types of PIM processes including a thermoplastic resin, a gellation, a thermosetting resin, and a condensation-reaction debinding process. The fundamental distinction between the processes is that the first employs a thermoplastic resin in a binder, the second a gum dissolved in a solvent, the third an addition-reaction thermosetting resin in the binder, and the last a condensation-reaction thermosetting resin.

In the thermoplastic resin process, a feedstock mixture includes both thermoplastic resins and powders, the resin material being added to a powder or mixture of such powders in a volume sufficient to fill the void volume of the powder. Mixing is done using a high shear mixture and is carried out at a temperature sufficiently high that the viscosity of the plastic material is reduced to a level where the powder and resin material is uniformly mixed. The resultant mixture is formed into pellets which are heated and then injected into a cooled die. Here, the thermoplastic resins increase in viscosity to a level where a part formed from the mixture is sufficiently solid that it can be ejected from the die without losing its shape. In a subsequent step, the binder material is removed, this being done by solvent extraction, wicking (such as taught by U.S. Pat. No. 4,404,166), sublimation, or decomposition (such as taught by U.S. Pat. No. 4,225,345). Regardless of the method, only a portion of the binder is removed using these techniques. The part is now gas permeable, which permits the remaining binder to be thermally decomposed, this being done at a low enough temperature that the binder material is removed without reacting with the metal powder. This also prevents internal gas pressures from rising to a level which would destroy the part. Further, the thermoplastic binder forms a liquid phase before removal that can cause part deformation if the part is not removed from the mold slowly and in a controlled manner. A disadvantage of this process is its performance requires substantial processing time, as well as specialized equipment for the mixing and debinding operations.

The gellation process involves a modifier and an organic binder (an industrial gum) dissolved in a solvent. The binder, solvent, modifier and powders are mixed together and injected into a heated mold. The result is an increase in the viscosity of the mixture to a point where the part is strong enough to retain its shape upon removal from the mold. The part is then heated to evaporate the solvent and further strengthen the part. After the evaporation step, the organic binder is thermally decomposed and removed. The binder removal temperature is kept low enough to prevent the part from sintering. After this step, all of the organic binder material has been completely removed from the part.

The thermosetting resin process is similar to the thermoplastic resin process in that it also utilizes a plastic medium mixed with powders. A feedstock material is injected, under pressure, into a heated mold. The part is subsequently heated to a temperature at which the thermosetting material undergoes an addition reaction. This gives the molded part sufficient strength to be ejected from the mold. A problem with this process occurs in the debinding step and is caused by the length of time required to remove the solidified thermosetting binder due to the thermal and chemical stability of the thermosetting materials. Because of this, purely addition-thermosetting binders are effectively used only when the binder is not totally removed from the part being produced. Rather, it is desirable for the binder to react with the powder material in the feedstock such as when silicon-carbide articles are being produced.

Each of these above described processes involves additional steps between molding of parts and their subsequent sintering. These additional steps are required to further remove binder material and other by-products created during the molding operation. However, these additional steps increase processing time, and require additional equipment, thus adding to the overall cost of making parts, as well as increasing the complexity of the manufacturing process. Additionally, in the thermoplastic resin process, feedstock comprising a solidified powder/binder mixture must be remelted prior to injection into a mold. This necessitates use of a high intensity, thermally controlled mixing apparatus.

A result of these process drawbacks is that it is seldom economical to use one of the processes unless a production run is for fifty thousand (50,000) pieces or more. And, even for larger quantities, reproduction and engineering costs are usually higher because prototyping and short run molding techniques cannot be used.

In U.S. Pat. Nos. 5,033,939 and 5,059,387, which are assigned to the assignee of the present application, there is described a process in which a binder having a thermosetting, condensation resin as its main constituent is mixed with an appropriate powder. This process is now commonly referred to as debinding reaction injection molding (or D-RIM) in the PIM field. According to these patents, a powder is mixed with an oxidizing agent and/or a surface modifying agent. The binder includes modifiers such as acids, glycerin, and alcohols. Further, a latent catalyst is added to the mixture to lower curing temperature and speed-up curing time. The feedstock has a viscosity less than 150,000 cps, allowing it to be readily mixed. The mixture is injected into a hot die where it cures. During curing, a partial debinding occurs, leaving a porous part held together by the remaining binder material with which the powder particles are coated. Final debinding and part sintering occur in one step in a vacuum furnace.

This D-RIM process has a number of advantages over those processes previously described. A significant advantage is the need for less specialized equipment than the other processes require. Another advantage is a substantial reduction in process time, which translates into increased throughput. As a result, the D-RIM process lends itself both to rapid prototyping and small volume production runs, because both are now economically feasible whereas, as noted, they are not with the other processes.

However, even though the D-RIM process has significant advantages, there are areas in which the process can be improved. For example, the catalyst currently preferred for use in forming the feedstock mixture is a zinc-chloride ($ZnCl_2$) catalyst such as an Ashland 65-058 catalyst. A drawback with using a $ZnCl$ catalyst is first, that zinc vaporizes when the mixture is heated and is deposited on the wall of the furnace; and second, there is a chlorine build-up on exhaust lines from the furnace which occurs during part sintering. Further, the binder/powder mixture has a limited shelf life (approximately eight (8) hours) from the time the catalyst is added to the mixture. Also, the curing time (which is on the order of one-to-five (1–5) minutes) substantially reduces or eliminates any saving in process time realized by eliminating the debinding step between molding and curing of a part. Another disadvantage is green strength of the part. It will be understood that mixture rheology and green strength of a part are inversely related. In a green part, a Modulus of Rupture (MOR) of less than 80 psi is achievable. But, rheology can be compromised to a point where feedstock cannot be injected into a mold.

SUMMARY OF THE INVENTION

Among the several objects of the present invention may be noted the provision of a PIM manufacturing process, and in particular, a D-RIM process in which the above mentioned problems or drawbacks are overcome;

the provision of such a process for molding small parts, intricately shaped parts, and parts made in small quantities involving limited production runs;

the provision of such a feedstock comprising a metal powder, ceramic powder, or mixture of ceramic and metal powders coated with a surfactant material, and a thermosetting resin including a latent catalyst which is mixed with the powder;

the provision of such a feedstock to further comprise modifiers for improving rheology of the mixture, solids loading, and to keep the powdered feedstock material from inhibiting a catalytic reaction which occurs as part of the manufacturing process;

the provision of such a latent catalyst to be a metal salt such as a member of trifluoromethanesulfonic acid family of metal salts;

the provision of such a latent catalyst to be a copper trifluoromethanesulfonic acid or copper triflate member of the family;

the provision of such a latent catalyst of the trifluoromethanesulfonic acid family to be a latent salt, with the exception of copper triflate, when combined with a furfuryl alcohol binder material;

the provision of such copper triflate to be hydrated prior to mixing with the binder material to render it latent;

the provision of such modifiers to increase the viscosity of the resin and to enhance the dilatancy of the feedstock for the feedstock to flow into a mold, and to become increasingly dilatant as the mold is filled;

the provision of such a feedstock in which its flow characteristics are controllable to speed-up in-mold debinding and reduce or eliminate the clogging of mold vents;

the provision of such modifiers to be an ethyl cellulose or methyl cellulose modifier which is combined with furfuryl alcohol;

the provision of the addition of a modifier to the feedstock further to inhibit binder separation;

the provision of such a feedstock to further include a catalyst inhibitor such as an aliphatic blocking amine;

the provision of such an amine to be a di-isopropylamine;

the provision of such a feedstock having good flow characteristics and in which the binder material does not separate from the rest of the mixture;

the provision of such a feedstock having faster curing times which are readily obtainable using conventional molding equipment, and with the resultant parts having a MOR which is substantially higher than that of similar parts made with conventional feedstock materials;

the provision of such a feedstock in which parts made with the feedstock to have a high green strength, and in which there is a balance between the force of gases escaping from the part and the forces keeping the powder particles together;

the provision of such a feedstock in which gas by-products are easily removed from parts, and in which the waste stream of material from the molding equipment has non-hazardous materials, whereby the D-RIM process is environmentally safe; and, the provision of such a feedstock to have a usable life substantially greater than current feedstock materials, the improved feedstock being usable for days rather than hours after mixing, and the feedstock showing no substantial increase in viscosity over this extended period, whereby the feedstock is more economical to use than previous feedstocks.

In accordance with the invention, generally stated, a D-RIM type of PIM process is used in the manufacture of parts. A feedstock used with the process includes a mixture of one or more metal powders which are combined together. The mixture is coated with a surfactant to improve rheology and to keep the powder from inhibiting a catalytic reaction which occurs during the process. A condensation thermosetting resin is B-staged or mixed with a modifier. A latent catalyst is then mixed with resin and added to the powder. The various constituents are mixed together to form a uniform feedstock mixture. The mixture is injected into a heated mold whose shape corresponds to that of a part to be made. The mixtures cures in the mold and a partial debinding occurs. When the part is removed from the mold, it is sintered. An improvement to the process includes use of metal salts as the catalyst added to the feedstock mixture. The metal salt is a member of the trifluoromethanesulfonic acid family of metal salts, and is preferably a copper trifluoromethanesulfonic acid which is also referred to as copper triflate. The improved feedstock material has an extended shelf life which allows it to be usable longer than current feedstock materials. Viscosity of the feedstock material is also not time dependent further allowing the feedstock material to be stored for an extended period prior to use. The feedstock is now slightly dilatant mixture which makes the material easier to flow into a substantially full mold. The MOR and green strength of a part made from the new feedstock is improved over that made using other PIM processes. And, parts cure at least as quickly as parts made from other feedstock materials. Other objects and features will be in part apparent and in part pointed out hereinafter.

DESCRIPTION OF A PREFERRED EMBODIMENT

The present invention is directed to a feedstock material particularly for use in a debinding-reaction injection molding process for powder injection molding of parts. A basic formulation for a feedstock material used in D-RIM processes is described in co-assigned U.S. Pat. No. 5,033,939. It has been found however, that while the feedstock material formulations set forth therein allow complex parts having controlled density and porosity to be manufactured, improvements in the feedstock material would provide even better parts, while at the same time allowing parts to be made more easily, at least as quick as parts are currently produced, and with a higher green strength.

Before proceeding with a description of the feedstock of the present invention, it will be understood that there are a number of conditions which should be met for the successful production of parts with a D-RIM feedstock mixture. The first requirement is that the binder must not separate from the powder and the feedstock must have flow properties independent of green strength. The molecular weight (and therefore viscosity) of the resin must be increased either by B-staging it or by adding modifiers to the resin. If the resin is not modified or B-staged, the powder will settle while the resin is stagnant or, due to inertial differences, the binder will separate from the powder during flow. Unlike previous methods, the use of an industrial gum that is not affected by and does not tie up metal salts (Lewis acids) creates a part whose green strength is independent of flow characteristics.

A second requirement is that the molding temperature must be increased. In order to mold articles faster than previous D-RIM techniques, the molding temperature needs to be increased above the boiling point of the byproduct of the condensation reaction. Previous techniques relied on maintaining a liquid byproduct that would not compress and would therefore permeate the void space between particles until the byproducts could be vented from the mold cavity. A constant hydrostatic force throughout the part stopped particles from moving and forming defects. The technique of the present invention allows for the handling of gaseous byproducts without forming defects. This is accomplished by balancing the forces acting on powder particles.

A third requirement is that while curing, the forces pushing powder particles apart must be balanced with forces keeping powder particles together. These are the force from gas generated within the part that push the feedstock particles apart, and the forces between the individual particles produced by cured binder, which keeps the feedstock whole. These gases are created when the part begins to cure. Without any force to keep powder particles in place, the gas will form pores and cracks in the feedstock, making the final piece unusable.

A fourth requirement is for as high a green (cured part) strength as possible. Green strength may be increased in several ways. Coating the powder particles allows for a high solids loading of the feedstock and a negation of the surface chemistry of the inorganic, which limits the strength of the green part. Use of a stronger Lewis acid catalyst drives the reaction to a higher green strength in a shorter period of time when compared to other methods. Eliminating the large amount of water formerly used in the binder, which acts as both a dilutant and a solvent of the resin, also increased green strength.

A fifth requirement is that the vents in the mold must be kept free of clogs in order to remove any gases that are created by the chemical reaction in the feedstock. If these gases are not removed, the parts will develop cracks or possibly explode when removed from the molds. To prevent the molds from clogging, the present invention aims for specific dilatant flow characteristics at a high shear strength, but a very low viscosity flow with shear rates below where the dilatancy occurs. In this manner, a complex die cavity can be filled, but when the cavity is filled, the forces of reaction cause the dilatant effect to occur, shutting down any further feedstock flow, and preventing the flow of feedstock into gas removal vents. The vents do not clog with feedstock, so any gases can be removed without damaging the parts.

A sixth requirement is for a sufficiently long feedstock work life. To insure the longest possible work life, any chemical reactions taking place in the feedstock at or slightly above room temperature must be slowed or stopped. This involves adjusting the pH of the feedstock to near neutral conditions. Or, shelf life can be extended by refrigeration of the feedstock.

A seventh requirement is for an oxidizing agent that must be included in the feedstock for binder removal to low carbon levels as disclosed in U.S. Pat. Nos. 5,033,939 and 5,059,387.

Eighth and finally, is for safe handling of toxic byproducts and processing materials. The waste stream of the present invention must not contain materials that are hazardous to humans or harmful to equipment. The waste products must be capable of being disposed of in a manner that is not harmful to the environment.

The D-RIM process, in accordance with the improvements as set forth herein, involves four steps. First, a powdered material, or combination of materials depending upon the final feedstock formulation, is coated with a surfactant material such as an organo-functional silane. Second, a feedstock material is formed. This material is a mixture of the coated powder, a thermosetting resin, and a metal salt of a trifluoromethanesulfonic acid. The resultant mixture is then injected a die having a mold cavity shaped for the part to be made. After molding, the part is allowed to cure. During this time, partial debinding occurs resulting in a part held together by remaining binder material with which powder particles are coated. The part is then removed from the mold and placed in the vacuum furnace where a final debinding occurs as does sintering of the part. Both final debinding and sintering occur in one step.

In more detail, the powders used in the feedstock should have an average particle size of between 4 and 6 microns, and a maximum particle size of approximately 22 microns. The powder may include an oxygen bearing material to aid in controlling the amount of Carbon produced during part sintering. The powders are coated with an organo-functional silane. Procedures for coating a material with silane are well-known in the art and will not be described. Coating the powders with silane has the advantages of reducing the viscosity of the feedstock increasing solids loading, and preventing the powders from inhibiting the actions of a catalyst included in the feedstock.

In mixing the feedstock material, a thermosetting resin (preferably furfuryl alcohol) incorporated in the feedstock is altered either by the addition of a modifier material, or by "B-staging". B-staging, as is known in the art, involves increasing the viscosity of a thermosetting resin by a partial polymerization of the resin material. B-staging partially reacts the resin outside a mold cavity, removing a portion of the gas formed during polymerization. Thus, less gas is released in the mold. Viscosity of a furfuryl alcohol thermosetting resin can also be increased by addition of a modifier. For feedstock of the present invention, preferred modifiers are ethyl cellulose and methyl cellulose. The amount of modifier added to the furfuryl alcohol is approximately 3%, by weight, of the resin. The importance of B-staging and/or the addition of a modifier besides increasing viscosity and inhibiting powder from settling out of the binder, is that it makes the feedstock slightly dilatant at higher pressures. Dilatancy is important because as the mold becomes fuller, the pressure required to inject more feedstock into the die increases, subjecting the feedstock to a higher shear rate. If the feedstock is dilatant under a high shear rate, then the powder particles will behave, under that high shear rate, like a solid. Gas can be removed through a dilatant, pseudo-solid body more quickly than through parts that have other compositions. In addition, the balance of forces acting on the powder particles is such that gas porosity is not produced. Further, feedstock will not be forced into the mold vents. Forcing feedstock material into mold vents is bad because it subsequently prevents effective venting of water and other vapors from the mold; which, in turn, will damage the part being produced.

In addition to a modifier, a latent catalyst material is also added to the feedstock material. The preferred catalysts are metal salts of trifluoromethanesulfonic acid; and, in particular, copper, lithium, silver, chromium, and nickel trifluoromethanesulfonates (i.e., triflates). All of these salts except copper triflate are latent when added to furfuryl alcohol. To render copper triflate latent before adding it to the furfuryl alcohol resin, the copper triflate is hydrated. The level of hydration ranges, for example, between 13% and 52%, by weight. As best understood, during hydration, water molecules attach themselves to the copper salt molecules so that extreme polar sites on the molecule (which would normally destabilize furfuryl alcohol), are stereoscopically hindered (i.e., rendered neutral). When properly hydrated, copper triflate is added to a pH stabilized furfuryl alcohol/ethyl cellulose binder solution. And, when the feedstock material is subsequently heated in a mold cavity, the copper salt/water molecules decompose. This restores the catalytic activity of the copper triflate. A major advantage attained by use of a copper triflate catalyst is that it extends the usability of the feedstock from a matter of hours to up to three days; and, in doing so, the rate of increase in viscosity of the feedstock over this period is less than ten (10) cp.

A stabilizer may be added to the resin, after the modifier material is added, or after B-staging. The stabilizer increases the work (shelf) life of the feedstock. The work life of the feedstock is the period of time after the feedstock is prepared that it can be successfully used to make parts. Currently, this period is a matter of hours. In accordance with the invention, for the improved feedstock material has a work life on the order of three days. Since the work life is so significantly extended, it means there is less wasted feedstock. The stabilizer is, for example, a catalyst inhibitor such as glycerin or a strong organically based material. Examples of such material or an aliphatic blocking amine such as di-isopropylamine, di-isopropylethylamine, and di-isopropylethanolamine.

When a latent catalyst is used, an acid generating ester may be added as a catalyst enhancer. As described in U.S. Pat. No. 3,907,706, the ester decomposes to release a chelating acid upon heating. The acid forms a non-ionizing chelation complex with the metal atom leaving the triflic acid to polymerize the resin.

When powders are combined with the binder mixture, the feedstock is produced by mixing the ingredients, under vacuum, in a blender. A double planetary blender is suitable for this purpose. One method of blending is to mix the feedstock for approximately nine minutes, while periodically increasing the speed of the blender. A homogeneous and consistent feedstock is produced if the mixture temperature is approximately 100° F. (37.8° C.). Since, as noted, the feedstock material initially exhibits psuedo-plastic characteristics during injection into a mold, the initial viscosity of the feedstock at that time is at least partially dependent upon the mixing temperature.

The feedstock is injected into the mold cavity of a hot, vented mold. The importance of the feedstock of the present invention can best be understood with respect to the following example. If a conventional feedstock material were injected into a mold cavity having dimensions of ½"×½"×1 and ¼" (1.27 cm×1.27 cm.×3.17 cm), part curing would occur within a temperature range of 300° F.–375° F. (149° C.–190° C.). The curing time would be between approximately 1 minute 45 seconds, and five minutes. With the preferred feedstock of the present invention, a preferred mold temperature for curing is 325° F. (163° C.). Curing time is approximately three minutes, thirty seconds. While these results may not seem extraordinary based upon the results obtained using previous feedstocks, it will be noted that the improved feedstock allows for similar curing times and temperatures while providing a dilatant feedstock which is much easier to inject into the mold than these prior feedstock, and a feedstock having a shelf life or usable life of days, rather than hours.

After removal of a partially cured part from a mold, the part is placed in a vacuum furnace for final debinding and sintering. Debinding and sintering times and temperatures are a function of the metal powder used in the feedstock the amount of binder, the amount and particle size of the oxidizing agent used, and the thickness of the various part sections.

The following are illustrative examples of feedstock mixtures. They are not to be interpreted as limiting the scope of the invention. Examples 1–8 involve binder reactions carried out using polypropylene beakers on a hot plate and demonstrate the results of various catalysts, catalyst enhancers, and catalyst inhibitors. Examples 9–11 involve parts made after hand mixing a feedstock material and spooning the feedstock into a mold. Example 12 tests the work life of a feedstock and the capability of the feedstock to produce parts in a manufacturing setting. Examples 13–17 represent tests done to determine the MOR of parts made in a manufacturing setting.

EXAMPLE 1

0.4 g of furfuryl alcohol was mixed with 0.125 g of dry copper triflate. The resultant mixture produced an instant reaction, and produced a brittle, polymerized mass.

EXAMPLE 2

0.4 g of furfuryl alcohol was mixed with a 0.125 g of hydrated (13% by weight $H_2O$) copper triflate. The resultant mixture reacted violently at 160° F. (71° C.), again producing a brittle, polymerized mass.

EXAMPLE 3

0.4 g of furfuryl alcohol was mixed with 0.125 g of chromium triflate. The mixture was reacted at 150° F. (65° C.) producing a hard, polymerized mass.

EXAMPLE 4

0.4 g of furfuryl alcohol was reacted with 0.125 g of hydrated (13% by weight $H_2O$) of copper triflate, and 0.125 g of di (2methyl-2hexyl) oxalate. The mixture reacted at 113° F. (45° C.) and produced a brittle, polymerized mass.

EXAMPLE 5

0.4 g of furfuryl alcohol was reacted with 0.125 g of chromium triflate, and 0.125 g of di (2methyl-2hexyl) oxalate. The mixture reacted at 150° F. (65° C.) and produced a very hard, polymerized mass.

EXAMPLE 6

0.4 g of furfuryl alcohol was reacted with 0.125 g of hydrated copper triflate (13% by weight $H_2O$), 0.125 g of di (2methyl-2hexyl) oxalate, and 0.5 g of glycerin. The mixture reacted violently at 130° F. (54° C.) producing a very hard, polymerized mass.

EXAMPLE 7

0.4 g of furfuryl alcohol was reacted with 0.125 g of chromium triflate, and 0.125 g of di (2methyl-2hexyl) oxalate. The mixture reacted at 180° F. (82° C.) and produced a rubbery, soft polymerized mass.

EXAMPLE 8

20.05 g of furfuryl alcohol was reacted with 5 drops of di-isopropylamine, and 1.15 g of hydrated copper triflate (43% by weight $H_2O$). The mixture reacted at 200° F. (93° C.) producing a brittle, polymerized mass.

In examples 9–11, after a mold was filled with the feedstock it was placed between heated platens of a molding press, and the press was closed. A part was cured for five minutes and then removed from the press. After an additional thirty minutes of cooling, MOR tests were run on the part.

EXAMPLE 9

The feedstock comprised 2.625 g of a furfuryl alcohol, hydrated copper triflate mixture (4 parts furfuryl alcohol+0.25 parts hydrated copper triflate (13% by weight $H_2O$))

25 g silane-coated carbonyl iron powder 0.025 g ethyl cellulose

The measured MOR was 981 psi.

EXAMPLE 10

The feedstock comprised 2.625 g of a furfuryl alcohol, hydrated copper triflate mixture (4 parts furfuryl alcohol+0.25 parts hydrated copper triflate (13% by weight $H_2O$))

25 g silane-coated carbonyl iron powder 0.025 g methyl cellulose

The measured MOR was 809 psi.

EXAMPLE 11

The feedstock comprised 2.75 g of a furfuryl alcohol, hydrated copper triflate mixture (4 parts furfuryl alcohol+0.25 parts hydrated copper triflate (13% by weight $H_2O$))

25 g silane-coated carbonyl iron powder 0.075 g ethyl cellulose

The measured MOR was 1307 psi.

Example 12 (feedstock work life test)

| Powder | |
| --- | --- |
| 3472.51 g | carbonyl iron powder |
| 377.49 g | Fe3O4 |

The powder constituents were mixed together and coated with a silane surfactant in accordance with the teachings of the invention.

| Binder | |
| --- | --- |
| 388 g | furfuryl alcohol |
| 11.25 g | ethyl cellulose |
| 0.94 g | di-isopropylamine |
| 23.7 g | hydrated copper triflate solution (43% by weight H2O) |

The powder and binder were mixed and the resultant feedstock fed into an injection molding press. The feedstock was fed into the press over a period of three consecutive days. Good, consistent parts were produced throughout the test period.

For the feedstock mixture used for producing parts for MOR tests per Examples 13–17, all of the carbonyl iron powder was coated with a silane surfactant before being mixed with the binder material.

EXAMPLE 13

| Powder | |
| --- | --- |
| 3850 g | carbonyl iron powder |
| 11.25 g | ethyl cellulose |

| Binder | |
| --- | --- |
| 388.2 g | furfuryl alcohol |
| 14.58 g | hydrated copper triflate solution (13% by weight H2O) |
| Cure temperature | 340° F. (171° C.) |
| Cure time | 5 minutes |
| MOR | 2170 psi |

EXAMPLE 14

| Powder | |
| --- | --- |
| 3750 g | carbonyl iron powder |
| 11.25 g | ethyl cellulose |

| Binder | |
| --- | --- |
| 388.2 g | furfuryl alcohol |
| 14.58 g | hydrated copper triflate solution (13% by weight H2O) |
| Cure temperature | 325° F. (163° C.) |
| Cure time | 5 minutes |
| MOR | 1929 psi |

EXAMPLE 15

| Powder | |
| --- | --- |
| 3850 g | carbonyl iron powder |
| 6 g | ethyl cellulose |

| Binder | |
| --- | --- |
| 388.2 g | furfuryl alcohol |
| 14.58 g | hydrated copper triflate solution (13% by weight H2O) |
| Cure temperature | 325° F. (163° C.) |
| Cure time | 5 minutes |
| MOR | 1625 psi |

EXAMPLE 16

| Powder | |
|---|---|
| 3850 g | carbonyl iron powder |

| Binder | |
|---|---|
| 388.2 g | furfuryl alcohol |
| 11.25 g | ethyl cellulose |
| 14.58 g | hydrated copper triflate solution (13% by weight H2O) |
| Cure temperature | 325° F. (163° C.) |
| Cure time | 5 minutes |
| MOR | 1927 psi |

EXAMPLE 17

| Powder | |
|---|---|
| 3850 g | carbonyl iron powder |

| Binder | |
|---|---|
| 390.8 g | furfuryl alcohol |
| 10.4 g | ethyl cellulose |
| 0.651 g | di-isopropylamine |
| 20.9 g | hydrated copper triflate solution (52% by weight H2O) |
| Cure temperature | 325° F. (163° C.) |
| Cure time | 5 minutes |
| MOR | 1545 psi |

What has been described is an improved PIM manufacturing process, particularly, an improved D-RIM process used for molding small and intricately shaped parts, and parts made in limited quantities. The D-RIM process employs a feedstock having attributes which make the feedstock advantageous to use for the type and quantity of parts manufactured using the process. According to the improvement, a feedstock comprises powders coated with a surfactant material, and a thermosetting resin including a latent catalyst which is mixed with the powder. Modifiers are added to the feedstock mixture to improve rheology. This latent catalyst is a metal salt and is preferably a member of the trifluoromethanesulfonic acid family of metal salts. In particular, the latent catalyst is a copper trifluoromethanesulfonic acid, also known as copper triflate. The catalyst further is a latent salt, with the exception of copper triflate, when combined with a furfuryl alcohol. The copper triflate is hydrated prior to mixing with the resin. Use of a modifier is advantageous because it increases the viscosity of the binder and enhances the dilatancy of the feedstock. This is important because it allows the feedstock to become increasingly dilatant as the mold fills. Addition of the modifier to the feedstock also inhibits binder separation. The preferred modifier is an ethyl cellulose or methyl cellulose modifier which is combined with the furfuryl alcohol. Finally, the feedstock may also be modified to include a catalyst inhibitor, this being an aliphatic blocking amine such as a di-isopropylamine; or, a catalyst enhancer such as an acid generating ester.

In addition to the improvement in the mixture due to its increased dilatancy, other advantages of a feedstock material comprising the improved mixture include an extended shelf life over current feedstocks, a viscosity in the feedstock material which is generally independent of shelf life, better MOR and green strength characteristics, and faster curing time.

In view of the foregoing, it will be seen that the several objects of the invention are achieved and other advantageous results are obtained.

As various changes could be made in the above constructions without departing from the scope of the invention, it is intended that all matter contained in the above description shall be interpreted as illustrative and not in a limiting sense.

Having thus described the invention, what is claimed and desired to be secured by letters patent is:

1. A feedstock for use in a debinding reaction injection process (D-RIM) for a powder injection molding (PIM) comprising:

a powdered metal, powdered ceramic material, or a mixture of powdered metal and powdered ceramic materials coated with an organo-functional silane;

a condensation-reaction thermosetting resin; and, a latent catalyst which is comprised of a metal salt.

2. The feedstock of claim 1 wherein the thermosetting resin is modified prior to mixing with the metal powders mixture.

3. The feedstock of claim 1 wherein the latent catalyst is a metal salt of the trifluoromethanesulfonic acid family of metal salts.

4. The feedstock of claim 3 wherein the metal salt comprises a copper triflate member of the trifluoromethanesulfonic acid family of metal salts.

5. The feedstock of claim 3 wherein the metal salt comprises one of a lithium triflate, nickel triflate, boron triflate, silver triflate, chromium triflate, or a magnesium triflate member of the trifluoromethanesulfonic acid family of metal salts.

6. The feedstock of claim 1 wherein the thermosetting resin is a furfuryl alcohol.

7. The feedstock of claim 2 further including B-staging the thermosetting resin to increase the viscosity of the feedstock.

8. The feedstock of claim 2 further including a modifier added to the thermosetting resin to increase the viscosity of the feedstock.

9. The feedstock of claim 8 wherein the modifier is an ethyl cellulose.

10. The feedstock of claim 8 wherein the modifier is a methyl cellulose.

11. The feedstock of claim 8 wherein the amount of modifier added to the thermosetting resin is approximately 3% by weight of the thermosetting resin.

12. The feedstock of claim 4 wherein the copper triflate is hydrated.

13. The feedstock of claim 12 wherein the copper triflate is hydrated between approximately 13%–52% by weight.

14. The feedstock of claim 1 including a stabilizer added to the feedstock to increase the work life of the feedstock, the work life being the period of time after the feedstock is prepared that it can be successfully used to make parts.

15. The feedstock of claim 14 wherein the stabilizer is a catalyst inhibitor.

16. The feedstock of claim 15 wherein the stabilizer is a glycerin.

17. The feedstock of claim 15 wherein the stabilizer is an aliphatic blocking amine.

18. The feedstock of claim 17 wherein the stabilizer is one of di-isopropylamine, di-isopropylethylamine, or di-isopropylethanolamine.

19. The feedstock of claim 1 further including the addition of a catalyst enhancer.

20. The feedstock of claim 19 wherein the catalyst enhancer is an ester of oxalic acid.

21. A method of preparing a feedstock for use in a debinding reaction injection process for powder injection molding of parts, the method comprising:

mixing together metal powder, ceramic powder, or a mixture of metal and ceramic powders coated with an organo-functional silane, a thermosetting resin; and a latent catalyst which is comprised of a metal salt, the powdered metal including a carbonyl iron powder, the thermosetting resin including a furfuryl alcohol, and the latent catalyst is a metal salt of the trifluoromethanesulfonic acid family of metal salts.

22. The method of claim 21 wherein mixing a latent catalyst includes mixing a copper triflate member of the trifluoromethanesulfonic acid family of metal salts with the other ingredients to form the feedstock.

23. The method of claim 22 further including hydrating the copper triflate.

24. The method of claim 23 wherein hydrating the copper triflate includes hydration by between approximately 13%–52% by weight.

25. The method of claim 21 further including modifying the thermosetting resin prior to mixing the resin with the powders.

26. The method of claim 25 wherein the thermosetting resin is B-staged prior to mixing with the powder to increase the viscosity of the feedstock.

27. The method of claim 25 wherein modifying the thermosetting resin includes adding a modifier to the resin to increase the viscosity of the feedstock, the modifier being one of either an ethyl cellulose or a methyl cellulose, and adding the modifier to the resin includes adding approximately 3% by weight of the modifier to the resin.

28. The method of claim 21 further including adding a stabilizer to the feedstock to increase the work life of the feedstock.

29. The method of claim 28 wherein the stabilizer is a catalyst inhibitor such as glycerin.

30. The method of claim 28 wherein the stabilizer is an aliphatic blocking amine chosen from one of di-isopropylamine, di-isopropylethylamine, or di-isopropylethanolamine.

31. The method of claim 21 further including adding a catalyst enhancer such as an ester of oxalic acid.

32. A feedstock for use in a debinding reaction injection process (D-RIM) for a powder injection molding (PIM) comprising:

a metal powder, ceramic powder, or mixture of metal and ceramic powders;

an organo-functional silane with which the powder is coated;

a B-staged thermosetting resin for increasing the viscosity of the feedstock, a copper triflate member of the family of the trifluoromethanesulfonic acid family of metal salts, the copper triflate being hydrated to between 13% and 52%, by weight and acting as a latent catalyst; and, a stabilizer added to the feedstock to increase the work life of the feedstock, the work life being the period of time after the feedstock is prepared that it can be successfully used to make parts.

33. The feedstock of claim 32 wherein the metal powder is a carbonyl iron powder and the thermosetting resin is a furfuryl alcohol.

34. The feedstock of claim 36 further including an ethyl cellulose modifier for increasing the viscosity of the feedstock.

35. The feedstock of claim 32 wherein the stabilizer is an aliphatic blocking amine chosen from one of di-isopropylamine, di-isopropylethylamine, or di-isopropylethanolamine.

36. A feedstock for use in a debinding reaction injection process for a powder injection molding comprising:

a powdered metal, powdered ceramic material, or a mixture of powdered metal and powdered ceramic materials coated with an organo-functional silane; and a hydrated latent catalyst which is comprised of a metal salt, said hydration being an amount effective to inhibit reactivity of said latent catalyst at room temperature.

37. The feedstock of claim 36 wherein the latent catalyst is copper trifluoromethanesulfonic acid.

* * * * *